(12) United States Patent
Fauteux et al.

(10) Patent No.: US 10,576,644 B2
(45) Date of Patent: Mar. 3, 2020

(54) ARTICULATED MECHANISM WITH INTERNAL BRAKE ASSEMBLY

(71) Applicant: KINOVA INC., Boisbriand (CA)

(72) Inventors: Philippe Fauteux, Boisbriand (CA); Louis Joseph Caron L'ecuyer, Boisbriand (CA)

(73) Assignee: KINOVA INC., Boisbriand (CA)

( * ) Notice: Subject to any disclaimer, the term of this patent is extended or adjusted under 35 U.S.C. 154(b) by 320 days.

(21) Appl. No.: 15/475,775

(22) Filed: Mar. 31, 2017

(65) Prior Publication Data

US 2018/0281208 A1 Oct. 4, 2018

(51) Int. Cl.
| B25J 19/00 | (2006.01) |
| H02K 7/102 | (2006.01) |
| H02K 7/14 | (2006.01) |
| H02K 21/22 | (2006.01) |

(52) U.S. Cl.
CPC ........ B25J 19/0004 (2013.01); H02K 7/1023 (2013.01); H02K 7/1025 (2013.01); H02K 7/14 (2013.01); H02K 21/22 (2013.01)

(58) Field of Classification Search
CPC ........................... B25J 19/0004; H02K 7/1025
See application file for complete search history.

(56) References Cited

U.S. PATENT DOCUMENTS

| 4,398,110 A * | 8/1983 | Flinchbaugh | .......... B25J 9/1025 310/83 |
| 4,507,046 A | 3/1985 | Sugimoto | |
| 4,678,952 A | 7/1987 | Peterson | |
| 5,103,941 A | 4/1992 | Vranish | |
| 5,155,423 A | 10/1992 | Karlen | |
| 5,720,590 A | 2/1998 | Hofmeister | |
| 8,058,757 B2 | 11/2011 | Himmelmann | |
| 8,291,788 B2 | 10/2012 | Ihrke et al. | |
| 9,475,199 B2 | 10/2016 | Burridge | |
| 2013/0039730 A1 * | 2/2013 | Sueyoshi | ................ B25J 9/042 414/685 |

(Continued)

FOREIGN PATENT DOCUMENTS

| CA | 2736506 A1 | 3/2010 |
| CN | 104552329 A | 4/2015 |
| KR | 20150029378 A | 3/2015 |

*Primary Examiner* — Terence Boes
(74) *Attorney, Agent, or Firm* — Norton Rose Fulbright Canada LLP

(57) ABSTRACT

A motorized joint unit of a mechanism comprises a rotor assembly and a stator assembly operatively assembled and configured for being secured to respective links of the mechanism. The rotor assembly and the stator assembly respectively include a rotor and a stator concurrently operable to cause a rotation of a rotor of the rotor assembly relative to a stator of the stator assembly about a rotational axis, a receiving volume delimited by one of the rotor assembly and stator assembly, the rotational axis passing through the receiving volume. A brake assembly is located at least partially in the receiving volume and comprising a brake plunger having a brake surface for brakingly engaging with a corresponding surface of the rotor assembly, the brake plunger displaceable in translation in the brake assembly, and a solenoid coil actuatable to displace the brake plunger against the rotor assembly.

20 Claims, 5 Drawing Sheets

(56) References Cited

U.S. PATENT DOCUMENTS

| | | | |
|---|---|---|---|
| 2013/0057119 A1* | 3/2013 | Kagawa | H02K 7/1025 310/68 B |
| 2013/0186726 A1* | 7/2013 | Collins | F16D 27/004 192/84.9 |
| 2014/0300229 A1* | 10/2014 | Imai | H02K 7/1025 310/77 |
| 2016/0036301 A1* | 2/2016 | Tominaga | H02K 11/001 310/68 B |
| 2016/0156288 A1* | 6/2016 | Sawamura | H02P 3/04 318/372 |
| 2016/0221184 A1 | 8/2016 | Sueyoshi et al. | |

* cited by examiner

ARTICULATED MECHANISM WITH INTERNAL BRAKE ASSEMBLY

TECHNICAL FIELD

The present application relates to robot arms and to an assembly of an internal brake thereof.

BACKGROUND OF THE ART

Robotic arms are increasingly used in a number of different applications, from manufacturing, to servicing, and assistive robotics, among numerous possibilities. Serial robot arms are convenient in that they cover wide working volumes. Standard topology of mechanical brakes for actuators of robot arms, such as serial robot arms, typically consists of a motor module, a gear module and a mechanical brake module. Such topology requires that these modules be stacked up in a way that the volume and the weight of the actuator are respectively large and heavy, and therefore inefficient for robotic arm actuators. For instance, serial robot arms must support their one weight, and the prior-art topology may thus need improvements.

SUMMARY

It is an aim of the present disclosure to provide a robot arm that addresses issues related to the prior art.

Therefore, in accordance with the present disclosure, there is provided a motorized joint unit of a mechanism, comprising: a rotor assembly and a stator assembly operatively assembled and configured for being secured to respective links of the mechanism, the rotor assembly and the stator assembly respectively including a rotor and a stator concurrently operable to cause a rotation of a rotor of the rotor assembly relative to a stator of the stator assembly about a rotational axis, a receiving volume delimited by one of the rotor assembly and stator assembly, the rotational axis passing through the receiving volume; and a brake assembly located at least partially in the receiving volume and comprising a brake plunger having a brake surface for brakingly engaging with a corresponding surface of the rotor assembly, the brake plunger displaceable in translation in the brake assembly, and a solenoid coil actuatable to displace the brake plunger against the rotor assembly.

Further in accordance with the present disclosure, there is provided a motorized joint unit of a mechanism, comprising: a rotor assembly and a stator assembly operatively assembled and configured for being secured to respective links of the mechanism, the rotor assembly and the stator assembly respectively including a rotor and a stator concurrently operable to cause a rotation of a rotor of the rotor assembly relative to a stator of the stator assembly about a rotational axis, a receiving volume delimited by one of the rotor assembly and stator assembly, and by radial planes delimiting axial ends of the stator, the rotational axis passing through the receiving volume; and a brake assembly comprising a brake plunger having a brake surface for brakingly engaging with a corresponding surface of the rotor assembly, the brake plunger displaceable in translation in the brake assembly, a solenoid support received at least partially in the receiving volume, the solenoid support fixed in rotation relative to the stator assembly, a biasing member biasing the brake plunger in a first direction of translation, and a solenoid coil supported by the solenoid support and actuatable to displace the brake plunger in a second direction of translation against a biasing of the biasing member.

DETAILED DESCRIPTION

Figure 1:
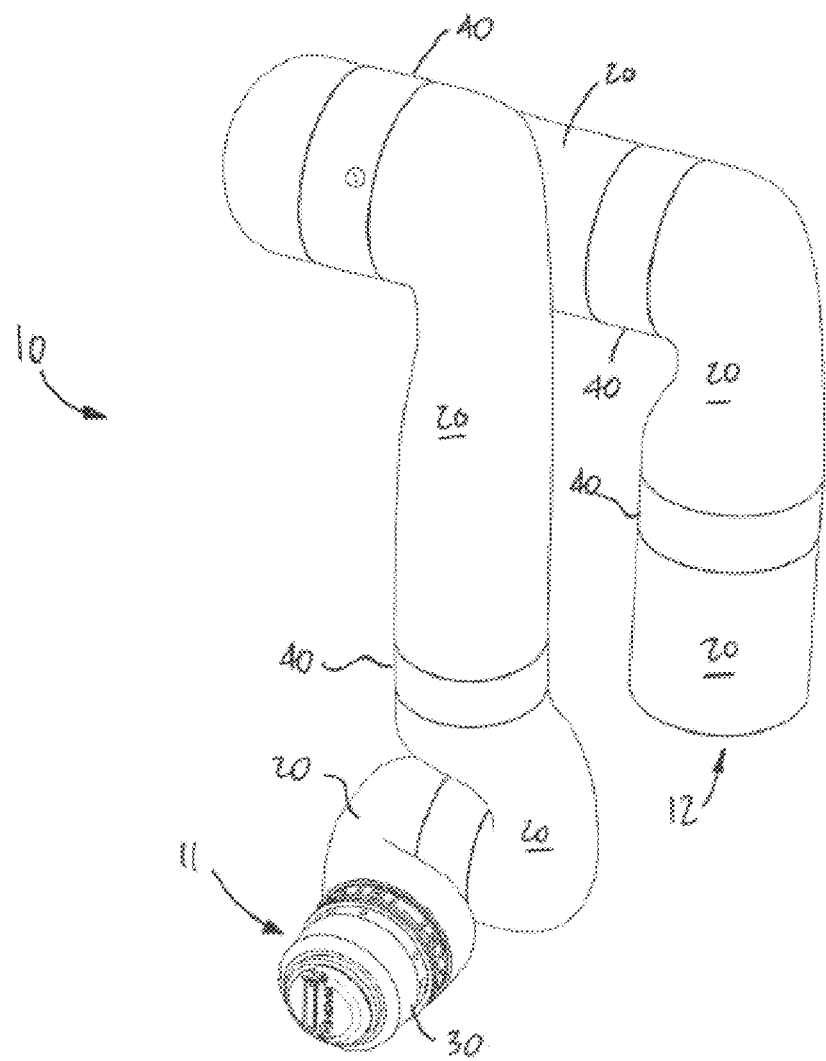
FIG. 1 is a perspective view of an articulated robot arm with internal brake assembly in accordance with an embodiment of the present disclosure.

Referring to the drawings and more particularly to FIG. 1, a mechanism such as a robot arm in accordance with the present disclosure is generally shown at 10. Although the internal brake assembly herein is shown on the robot arm 10, it may be used with other mechanisms, such as articulated mechanisms, or like mechanisms. However, for simplicity, the expression "robot arm" is used throughout, but in a non-limiting manner. The robot arm 10 is a serial articulated robot arm, having an effector end 11 and a base end 12. The effector end 11 is configured to receive any appropriate tool, such as gripping mechanism or gripper, anamorphic hand, and tooling heads such as drills, saws, etc. The end effector secured to the effector end 11 is as a function of the contemplated use. However, the robot arm 10 is shown without any such tool in FIG. 1, a motorized joint unit being shown instead, and ready for supporting a tool. The base end 12 is configured to be connected to any appropriate structure or mechanism. The base end 12 may be rotatably mounted or not to the structure or mechanism. By way of non-exhaustive example, the base end 12 may be mounted to a wheelchair, to a vehicle, to a frame, to a cart, to a robot docking station. Although a serial robot arm is shown the joint arrangement of the robot arm 10 may be found in other types of robots, included parallel manipulators.

The robot arm 10 has a series of links 20 (also known as shells), interconnected by motorized joint units 30 (one shown in FIG. 1), with sleeves 40 at the junction between adjacent links 20:

The links 20 define the majority of the outer surface of the robot arm 10. The links 20 also have a structural function in that they form the skeleton of the robot arm 10 (i.e., an outer shell skeleton), by supporting the motorized joint units 30 and tools at the effector end 11, with loads supported by the tools, in addition to supporting the weight of the robot arm 10 itself. Wires and electronic components may be concealed into the links 20, by internal routing.

The motorized joint units 30 interconnect adjacent links 20, in such a way that a rotational degree of actuation is provided between adjacent links 20. According to an embodiment, the motorized joint units 30 may also connect a link to a tool at the effector end 11, or to a base at the base end 12, although other mechanisms may be used at the effector end 11 and at the base end 12. The motorized joint units 30 may also form part of structure of the robot arm 10, as they interconnect adjacent links 20.

The sleeves 40 shield the junction between pairs of adjacent links 20. The sleeves 40 may form a continuous fastener-less surface from one link 20 to another.

Figure 2:
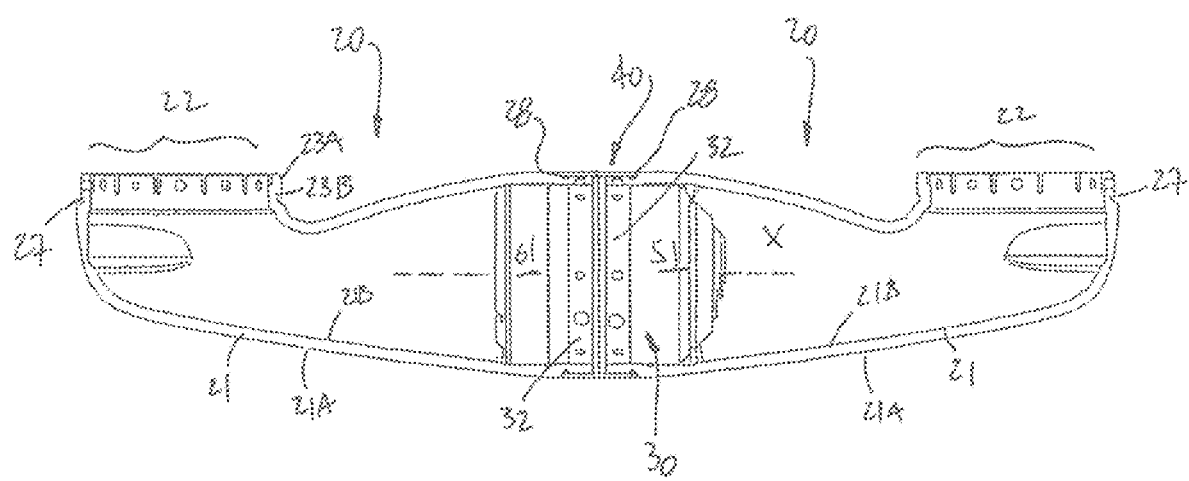
FIG. 2 is a partially sectioned view of a pair of links of the robot arm in FIG. 1, with a motorized joint unit in accordance with the present disclosure between the links.

Referring to FIGS. 1-2, the links 20 are shown in greater detail. Each of the links 20 has a tubular body 21. An outer peripheral surface 21A of the tubular bodies 20 form the majority of the exposed surface of the robot arm 10, with inner surfaces 21B delimiting the interior of the tubular bodies 21. The tubular bodies 21 may differ in length, in diametrical dimension, and in shape. For example, as shown in FIG. 1, some of the tubular bodies 21 may be generally straight or angled, i.e., arranged such that the rotation angles of the motorized joint units 30 at their opposed ends are parallel, perpendicular, or at any other angle. Some tubular bodies 21 may be longer, etc. Also, although the open ends of the tubular bodies 21 may have the same diameter for all motorized joint units 30 to be the same size, it is contemplated to scale down the motorized joint units 30 from the proximal base end 12 to the distal effector end 11 to reduce the overall weight of the robot arm 10. In such a case, the diameter of the open ends of the tubular body 21 may incrementally reduce toward the distal end. The tubular bodies 21 may consist of any appropriate material, including composites, plastics, metals, or any combination thereof. The tubular bodies 21 may be monolithic pieces, or an assembly of components, and may be molded, extruded, machines, etc.

The open ends of the tubular bodies 21 may each have a connector 22. In the serial robot arm 10, all of the links 20 has two connectors 22, namely one at each end of their tubular bodies 21, with the exception of the link 20 at the base end 12. However, other arrangements are possible as well, including the absence of such a connector 22 in the link 20 at the effector end 11, although the connector 22 is shown in such location in FIG. 1. Likewise, the link 20 at the base end 12 may have a connector 22.

Figure 3:
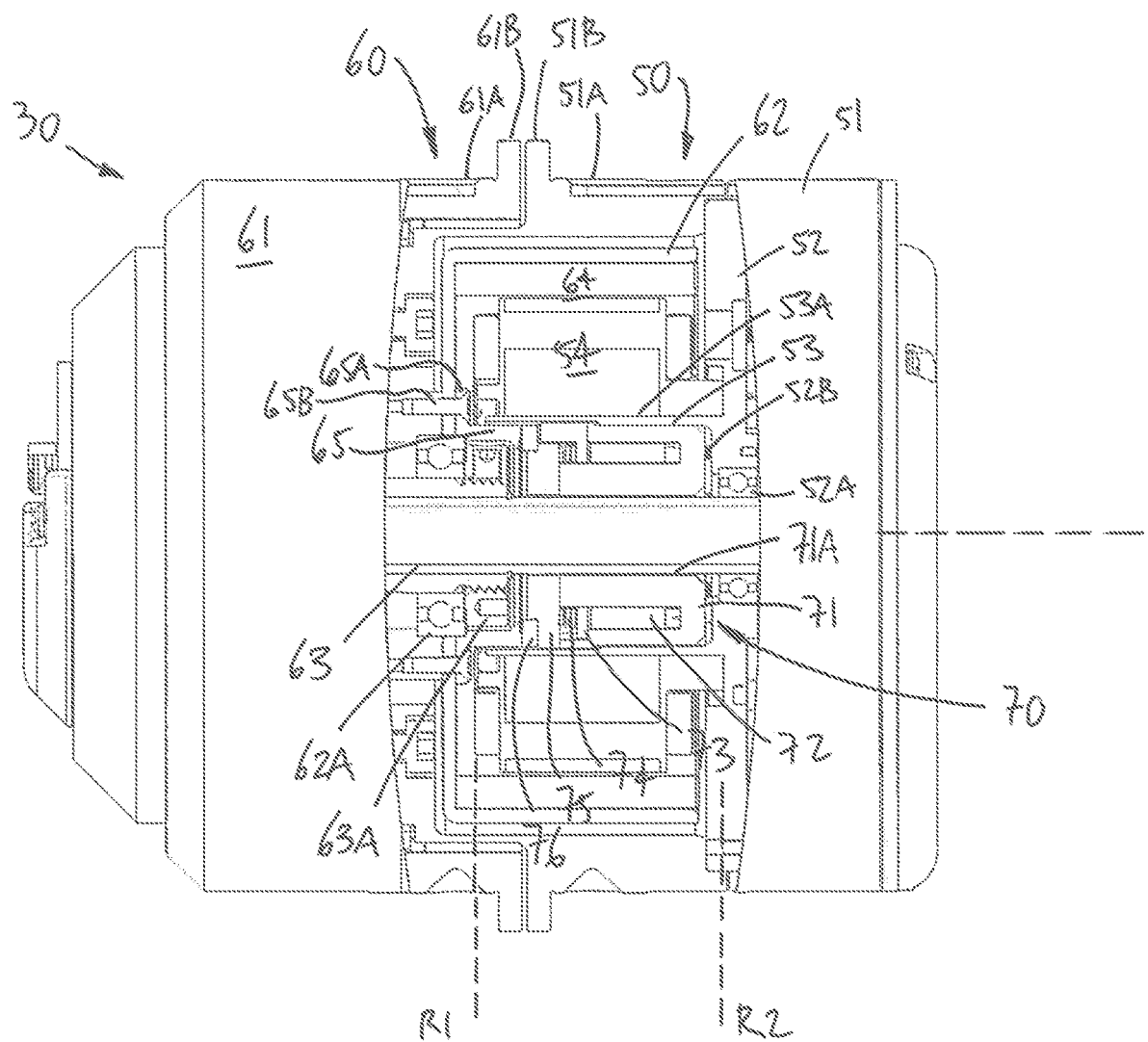
FIG. 3 is a partly fragmented sectional view of an interior of the motorized joint unit of FIG. 2, with hatching removed for clarity.

Referring to FIGS. 2 and 3, the connectors 22 are shown in greater detail. The connectors 22 may be annular in shape, with a circular section. The connectors 22 each form a neck from the main outer peripheral surface 21A of the tubular bodies 21 they are a part of. Stated differently, a step is present from the main outer peripheral surface 21A to the connector 22, due to a larger diameter of the tubular bodies 21 at the main outer peripheral surface 21A immediately adjacent to the connectors 22. The connectors 22 may each have a crown shape, defined by a plurality of tabs 23A projecting axially from an annular base 23B of the connectors 22, the tabs 23A separated by slots. Accordingly, this crown-shape arrangement allows some elastic deformation of the tabs 23A as they are connected to the motorized joint units 30, as described hereinafter, as the tabs 23A allow some cantilevering from the annular base 23B. The tabs 23A may support different types of connection bores, as a function of the fasteners used to connect the motorized joint units 30 to the connectors 22. For example, some of the tabs 23A have counterbored holes 24, some of the tabs 23A may have straight holes 25, while one of the tabs 23A may have a plug hole 26. In an embodiment, all connection bores may be the same in contrast to the arrangement shown in FIGS. 2 and 3.

An annular channel 27 is defined in the annular base 23B. The annular channel 27 is devised to receive therein an annular seal 28. There may be no annular channel 27, or more than one. The annular seal 28 may be any appropriate type of seal, such as O-ring, X-shaped ring, square-section ring, to seal an annular junction between the annular base 23B and the sleeve 40, as shown hereinafter. The annular seal 28 is made of an elastomer selected as a function of the contemplated use of the robot arm 10. For example, the selection of the annular seal 28 may depend on the temperatures to which the robot arm 10 will be subjected, the fluids that may contact the robot arm 10, etc.

Figure 4:
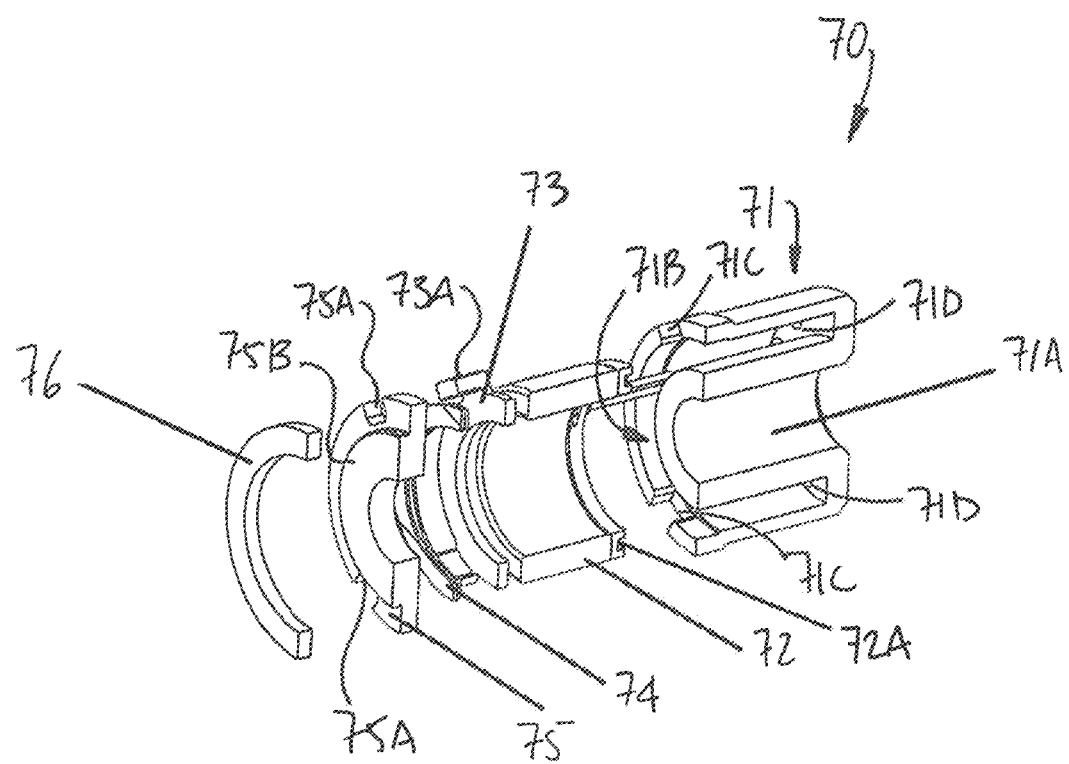
FIG. 4 is an assembly view of components of a brake assembly of the motorized joint unit of FIG. 2.

Referring to FIGS. 2-4, one of the motorized joint units 30 is shown in whole or in part. The motorized joint unit 30 is of the type having a stator assembly 50, a rotor assembly 60 rotatable relative to the stator assembly 50 along rotational axis X, as a response to actuation from the motorization components inside the motorized joint unit 30. A brake assembly 70 (FIGS. 3 and 4) is located inside the motorized joint unit 30, and inside components of the stator assembly 60, as described in detail below. The brake assembly 70 is controlled to stop or decelerate a rotation of the rotor assembly 60 relative to the stator assembly 50. Other components of the motorized joint unit 30 may include a gear module to reduce the speed of the rotor assembly, and electronic components (sensors, electronic card, processor) to control the operation of the motorized joint unit 30. The present disclosure focuses on the physical arrangement of the brake assembly 70, whereby other parts not affected by the operation of the brake assembly 70 may not be detailed.

Referring to FIGS. 2, 3 and 4, the stator assembly 50 has a casing shell 51. The casing shell 51 forms part of the structure of the stator assembly 50, as it is via the casing shell 51 that the stator assembly 50 is connected to the link 21. As shown in FIGS. 2 and 3, the casing shell 51 is secured in any appropriate manner to the tubular body 21 of the link 30. For example, the casing shell 51 may have an annular connector surface 51A in which fastener bores are circumferentially distributed, to match the distribution of connection bores in the connector 22. The fastener bores emulate the sequence of connection bores in the connector 22, if there is such a sequence of connection bores (as opposed to having a unique connection bore format). Therefore, the annular connector surface 51A may have bolt holes to be paired with counterbored holes, such that bolts or screws may have their heads received in the counterbore of the counterbored holes, and their threaded shaft threadingly engaged in the bolt holes. The annular connector surface 51A may have set holes to be paired with straight holes, such that set screws may be threadingly engaged in the set holes. However, other connection arrangements are possible, the above being provided as a non-exhaustive example. An end flange 51B may be at an end of the annular connector surface 51A, and may assist in keeping the motorized joint unit 30 axially aligned at the end of the tubular body 21, by forming a stop against axial displacement. This may prevent the motorized joint units 30 from being swallowed by the tubular body 21 during assembly, for example.

An end plate 52 may be inwardly located in the casing shell 51. The end plate 52 may also form part of the structure of the stator assembly 50, as components inside the motorized joint unit 30 are supported by the end plate 52 as described hereinafter. The end plate 52 may for example support bearing 52A to rollingly support a shaft of the rotor assembly 60. The end plate 52 may also threadingly support set screws 52B (FIGS. 3 and 5), accessible from an exterior of the end plate 52, the set screws 52B being displaceable along a rotational axis of the motorized joint unit 30 by being screwed or unscrewed. The set screws 52B are circumferentially distributed and allow the adjustment of axial position of the brake assembly 70, as described hereinafter.

Figure 5:
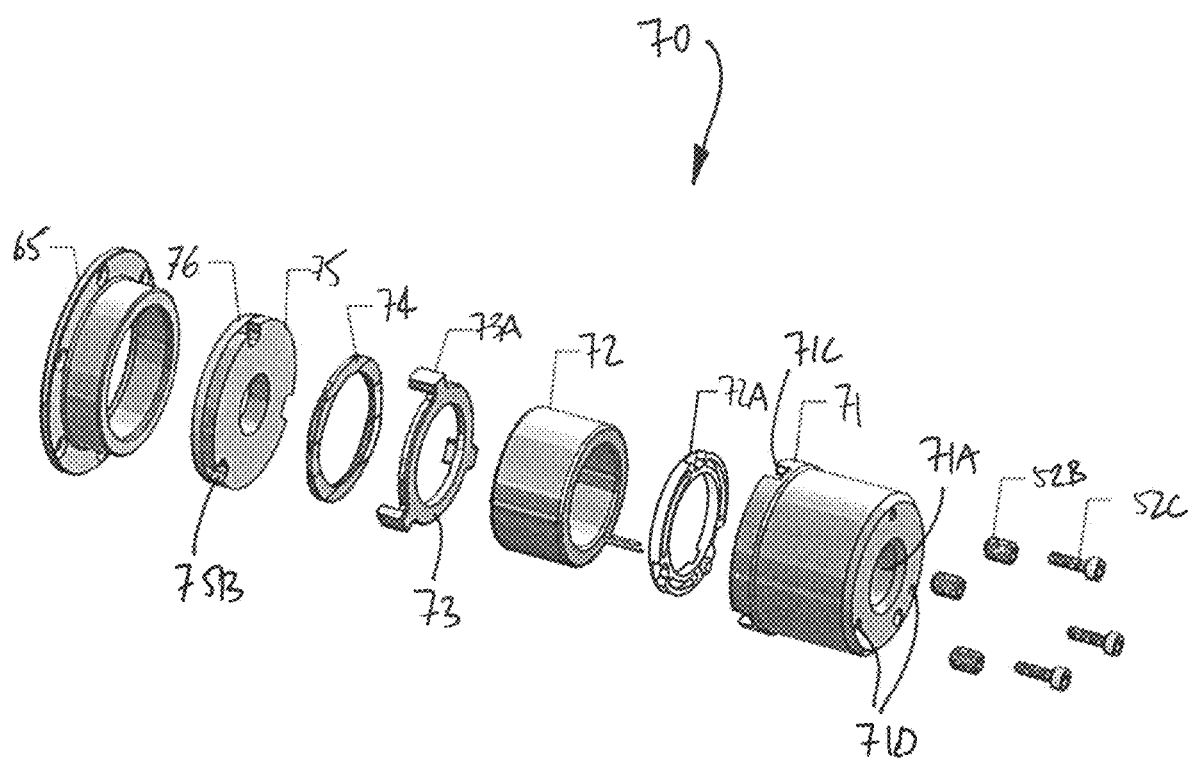
FIG. 5 is another assembly view of components of a brake assembly of the motorized joint unit of FIG. 2.

As shown in FIG. 5, other screws 52C may then be used to fix the brake assembly 70 in its axial position.

An annular receptacle 53 may project axially from the end plate 52. The annular receptacle 53 defines an outer peripheral surface 53A upon which the stator 54 is fixed. The stator 54 is of the type having a stator core with windings thereon, according to an embodiment. However, for simplicity, the windings and stator core are not shown in the figures. The annular receptacle 53 also defines an inner cavity 53B, for receiving parts of the brake assembly 70. The annular receptacle 53 is one contemplated solution to secure the stator 54 to the structural components of the stator assembly 50. For example, stator 54 may be fixed directly to the end plate 52.

The rotor assembly 60 rotates about the stator assembly 50 as a result of actuation of the stator 54. The rotor assembly 60 has a casing shell 61 having an outer shape similar to that of the casing shell 51 of the stator assembly 50. Accordingly, the casing shell 61 may have an annular connector surface 61A with a plurality of connection bores, and an end flange 61B, in similar fashion to the casing shell 51. Hence, the connection of the casing shell 61 to the tubular body 21 is not described, as the connection of the casing shell 51 to the tubular body 21 may be used as a reference. The two casing shells 51,61 are separated by a rotation plane, to which a vector of the rotational axis X is normal.

The rotor assembly 60 may have a drum 62. The drum 62 may be connected directly to the casing shell 61, although it is considered to have a gear module between the drum 62 and the casing shell 61, to reduce the speed of rotation of the casing shell 61 relative to that of the drum 62. However, such reduction may not be necessary in some embodiments, or according to some uses of the robot arm 10. In the illustrated embodiment, the rotor assembly 60 may have a shaft 63, with the shaft 63 being part of the gear module. The drum 62 may be interfaced to the shaft 63 by at least one bearing 62A. A connection ring 63A threadingly engaged on the shaft 63 may ensure that the bearing 62A remains captive between the shaft 63 and the drum 62.

As shown in FIG. 3, the drum 62 may be a monoblock component, with an inner cylindrical surface thereof supporting an external rotor 64. The external rotor 64 may for example be constituted of a plurality of permanent magnets, supported by a ring. For simplicity, the permanent magnets and the ring are not shown in the figures. However, the stator 54 and rotor 64 are selected as a pair to provide the desired rotation between adjacent links 20, for example in terms of speed and torque. A rotational axis is illustrated in FIG. 3. The stator 54 and rotor 64 are configured for reciprocating movement (i.e., clockwise and counterclockwise), and low frequency movements. The stator 54 and rotor 64 may be configured for small angular displacements. Non exhaustive or limitative rotor/stator kits that may be used include an external rotor motor (e.g., brushless), axial flux or pancake-type motor (brushed, brushless or stepper), internal rotor motors with hollow rotor. The rotor assembly 60 may further include an adaptor 65 with braking surface. The adaptor 65 is fixed to the drum 62 so as to rotate with the drum 62. The adaptor 65 may have a flange 65A to be rigidly secured to the drum 62, via fasteners 65B. Other connection arrangements are possible and contemplated. The adaptor 65 may also have an integral braking surface 66 or an add-on brake pad rigidly connected to it.

Referring to FIGS. 3 and 4, the brake assembly 70 is shown in greater detail. The brake assembly 70 has a solenoid support 71, also known as solenoid frame, defining the structural component of the brake assembly 70. The solenoid support 71 is fixed to the stator assembly 50. According to an embodiment, the solenoid support 71 is connected rigidly to the annular receptacle 53, in its inner cavity 53B. Therefore, the solenoid support 71 is received in a receiving volume delimited by the stator assembly 50. In an embodiment in which the motorized joint unit 30 has an internal rotor, the receiving volume for the brake assembly 70 would be delimited by the rotor assembly.

The solenoid support 71 has an annular body defining a shaft bore 71A, for the solenoid support 71 to be placed around the shaft 63. However, as observed in FIG. 4, a clearance between the solenoid support 71 and the shaft 63 ensures that the shaft 63 may rotate freely without contact with the solenoid support 71. The solenoid support 71 is fixed in rotation relative to the stator assembly 50, by any appropriate arrangements, such as fasteners, force, interference or like fit of the solenoid support 71 in the annular receptacle 53, etc. As observed, a substantial portion, if not all, of the solenoid support 71 is within the receiving volume.

The solenoid support 71 further defines an open annular cavity 71B and guide slots 71C on the periphery of the solenoid support 71 surrounding the open axial end of the open annular cavity 71B—the expression axial used herein meaning along the rotational axis of the rotor assembly 60. FIG. 4 suggests the presence of three of the guide slots 71C, although fewer or more guide slots 71C could be present. As also observed in FIG. 4, screw holes 71D may be defined in the closed end of the solenoid support 71. The screws 52C (FIGS. 3 and 5) may thus be screwingly engaged to the screw holes 71D to fix the solenoid support 71 in a descried axial position determined by the set screws 52B.

Components are then installed one after another from a bottom of the open annular cavity 71B, namely a solenoid coil 72 with or without an insulator ring 72A, a plunger guide 73, a biasing member 74 such as a spring, a brake plunger 75 and a brake pad 76. The shape of such components is dependent on the shape of the support 71, and each of the solenoid coil 72, the plunger guide 73, the biasing member 74, the brake plunger 75 and the brake pad 76 may have a portion of annular shape, in an embodiment, although other shapes are considered as well. The solenoid coil 72 is received in the open annular cavity 71B, and is connected to an appropriate controller to be actuated. The materials of the various components are selected such that an actuation of the solenoid coil 72 will result in a movement of the brake plunger 75. For example, the brake plunger 75 may be made in a ferromagnetic material drawn magnetically by the powering of the solenoid coil 72. The solenoid coil 72 may be, as non-exhaustive and non-limitative examples, magnet wire (typically a copper wire covered with an insulating material enamel) wound into an annular shape. The wire may be covered by an additional adhesive coat that can be activated with heat to enable the production of free-standing coils. Any type of suitable coil may be used provided it complies with the requirement of performance of the robot arm 10. The plunger guide 73, with radial tabs 73A, is then positioned axially onto the solenoid coil 72, so as to conceal the solenoid coil 72 in the annular cavity 71B of the solenoid support 71. The radial tabs 73A are received in the guide slots 71C, such that the plunger guide 73 is precluded from rotating. It is also observed that the radial tabs 73A project axially forwardly relative to a main annular body of the plunger guide 73, to interface with guide slots 75A in the brake plunger 75. Alternatively, radial tabs may be on the brake plunger 75 with corresponding slots in the plunger guide 73.

The spring 74 is sandwiched between the plunger guide 73 and the brake plunger 75, with the plunger guide 73 serving as footing for the spring 74 to apply its force. Alternatively, the spring 74 could come directly into contact with the solenoid coil 72. The annular brake pad 76 is rigidly connected to the brake plunger 75, for instance by surrounding a neck 75B of the brake plunger 75. The brake pad 76 may be made in a material different from that of the brake plunger 75, for instance to be replaceable. In an embodiment, the spring 74 is a compression spring that forces the plunger 75 toward the adaptor 65 of the rotor assembly 60, in braking contact. The spring 74 provides sufficient force for the plunger 75 to brake the rotation of the rotor assembly 60 by contact with the adaptor 65. The spring 74 may be a wave spring or a coil spring, for example. According to an embodiment, the spring 74 is made of a non-magnetic material to present short circuiting magnetic circuit components. The brake plunger 75 is prevented from rotating due to the presence of the guide slots 75A on its periphery, collaborating with the radial tabs 73A. It is also considered to provide a tension spring as an alternative configuration.

Therefore, during use, the brake assembly 70 is in a normal braking condition, in which the spring 74 biases the plunger 75 toward the adaptor 65 of the rotor assembly 60, whereby the braking surface 66 of the adaptor 65 and the annular brake pad 76 contact one another to block or limit rotation between the rotor assembly 60 and the stator assembly 50. When the solenoid coil 72 is actuated, the ferromagnetic content of the plunger 75 draws it toward the solenoid coil 72, thereby removing the contact between the braking surface 66 of the adaptor 65 and the annular brake pad 76, and allowing a rotation of the rotor assembly 60 relative to the stator assembly 50. This may be referred to as a brake release condition. The actuation of the solenoid coil 72 may often be in synchronization with the actuation of the winding on the stator 54. Other arrangements are considered, for instance by having other or fewer components in the brake assembly 70. For example, the brake could be actuated to the normal braking condition while the brake release condition would not be actuated, contrary to the teaching above. To ensure that the plunger 75 is sufficiently separated from the adaptor 65 in the brake release condition, the length of projection of the set screws 52B may be adjusted to determine the axial position of the solenoid support 71. A fine tuning or calibration of clearance may be effected before use.

It is observed that the brake assembly 70 is substantially located radially inward of the stator 54 and the rotor 64. This may be defined in different ways. For example, the brake assembly 70 is substantially if not completely within the receiving volume delimited by the radial planes delimiting the axial ends of the stator 54, shown as R1 and R2. The brake assembly 70 is thus in axial alignment with the stator 54. An outer diameter of the solenoid support 71 (e.g., mean diameter, max outer diameter) is smaller than an inner diameter of the stator 54 and than an inner diameter of the rotor 64. Substantial parts of the stator 54, of the rotor 64 and of the brake assembly 70 are in radial alignment. The solenoid support 71 is located inside the stator 54, with the stator 54 located inside the rotor 64. Although not shown, an internal rotor could be used, with an external stator, yet with the solenoid support 71 inside both.

The annular shape with open cavity of the solenoid support 71 is well suited for protecting and enclosing the various components, including the solenoid coil 72. However, other arrangements are considered as well. For instance, the solenoid support 71 may be an annular sleeve with the components mounted onto or inside the sleeve, as one of numerous embodiments. However, a simplified version of the brake assembly 70 is considered, in which the solenoid coil 72 is mounted directly and centrally into the receiving volume of the rotor/stator assembly, the solenoid coil 72 actuated to displace a brake plunger 75 coming into contact with the rotor.

The invention claimed is:

1. A motorized joint unit of a mechanism, comprising:
   a rotor assembly and a stator assembly operatively assembled and configured for being secured to respective links of the mechanism, the rotor assembly and the stator assembly respectively including a rotor and a stator concurrently operable to cause a rotation of a rotor of the rotor assembly relative to a stator of the stator assembly about a rotational axis, a receiving volume delimited by one of the rotor assembly and stator assembly and within the rotor assembly and stator assembly, the rotational axis passing through the receiving volume; and
   a brake assembly located at least partially in the receiving volume and comprising a brake plunger having a brake surface for brakingly engaging with a corresponding surface of the rotor assembly, the brake plunger displaceable in translation in the brake assembly, and a solenoid coil actuatable to displace the brake plunger against the rotor assembly.

2. The motorized joint unit of claim 1, further comprising a solenoid support received at least partially in the receiving volume, the solenoid support fixed in rotation relative to the stator assembly, and receiving therein the solenoid.

3. The motorized joint unit of claim 1, further comprising a biasing member biasing the brake plunger in a first direction of translation, the solenoid coil actuatable to displace the brake plunger in a second direction of translation against a biasing of the biasing member for braking engagement with the rotor assembly.

4. The motorized joint unit according to claim 1, wherein the rotor is an external rotor rotating around the stator, and wherein the receiving volume is delimited by the stator assembly.

5. The motorized joint unit according to claim 1, wherein the rotor assembly includes a drum, the brake surface of the brake plunger brakingly engaging a surface of a brake adaptor connected to the drum.

6. The motorized joint unit according to claim 2, wherein the solenoid support has an annular body defining an annular cavity with an axial open end of the annular body, the solenoid coil received in the annular cavity, the biasing member contacting the brake plunger via the open end.

7. The motorized joint unit according to claim 6, further comprising at least one hole at an opposed axial end of the annular body, and a screw for each said hole and extending from the stator assembly to said hole to fix an axial position of the solenoid support, and at least one set screw threadingly engaged to a throughbore of an end plate of the stator assembly and accessed from a side of the end plate opposite the solenoid support, the at least one set screw defining an abutment to determine the axial position of the solenoid support.

8. The motorized joint unit according to claim 3, further comprising a plunger guide between the biasing member and the solenoid coil, the plunger guide having an annular portion for being received in an annular cavity of the solenoid support.

9. A motorized joint unit of a mechanism, comprising:
a rotor assembly and a stator assembly operatively assembled and configured for being secured to respective links of the mechanism, the rotor assembly and the stator assembly respectively including a rotor and a stator concurrently operable to cause a rotation of a rotor of the rotor assembly relative to a stator of the stator assembly about a rotational axis, a receiving volume delimited by one of the rotor assembly and stator assembly, and by radial planes delimiting axial ends of the stator, the rotational axis passing through the receiving volume; and
a brake assembly comprising
a brake plunger having a brake surface for brakingly engaging with a corresponding surface of the rotor assembly, the brake plunger displaceable in translation in the brake assembly,
a solenoid support received at least partially in the receiving volume, the solenoid support fixed in rotation relative to the stator assembly,
a biasing member biasing the brake plunger in a first direction of translation, and
a solenoid coil supported by the solenoid support and actuatable to displace the brake plunger in a second direction of translation against a biasing of the biasing member.

10. The motorized joint unit according to claim 9, wherein the rotor is an external rotor rotating around the stator, and wherein the receiving volume is delimited by the stator assembly.

11. The motorized joint unit according to claim 9, wherein the rotor assembly includes a drum, the brake surface of the brake plunger brakingly engaging a surface of a brake adaptor connected to the drum.

12. The motorized joint unit according to claim 9, wherein the solenoid support has an annular body defining an annular cavity with an axial open end of the annular body, the solenoid coil received in the annular cavity, the biasing member contacting the brake plunger via the open end.

13. The motorized joint unit according to claim 12, further comprising at least one hole at an opposed axial end of the annular body, and a screw for each said hole and extending from the stator assembly to said hole to fix an axial position of the solenoid support.

14. The motorized joint unit according to claim 13, further comprising at least one set screw threadingly engaged to a throughbore of an end plate of the stator assembly and accessed from a side of the end plate opposite the solenoid support, the at least one set screw defining an abutment to determine the axial position of the solenoid support.

15. The motorized joint unit according to claim 12, further comprising a plunger guide between the biasing member and the solenoid coil, the plunger guide having an annular portion for being received in the annular cavity of the solenoid support.

16. The motorized joint unit according to claim 15, wherein the plunger guide has tabs projecting radially from the annular portion, the tabs received in corresponding guide slots in the annular support for being translationally guided.

17. The motorized joint unit according to claim 16, wherein the tabs of the plunger guide project axially toward the brake plunger and are engaged in corresponding slots in the brake plunger to guide a translation of the brake plunger.

18. The motorized joint unit according to claim 9, wherein the brake plunger supports an annular brake pad.

19. The motorized joint unit according to claim 9, wherein the stator assembly includes an end plate with a receptacle projecting axially from the end plate, the solenoid support fixed in an interior cavity of the receptacle.

20. The motorized joint unit according to claim 9, wherein the biasing member is a compression spring biasing the brake plunger into braking contact with the rotor assembly, the solenoid coil displacing the brake plunger away from braking contact with the rotor assembly.

* * * * *